United States Patent [19]

Märki et al.

[11] Patent Number: 4,982,608
[45] Date of Patent: Jan. 8, 1991

[54] HIGH-PRESSURE TRANSDUCER

[75] Inventors: Balz Märki, Winterthur; Peter Wolfer, Kleinandelfingen, both of Switzerland

[73] Assignee: Kistler Instrumente AG, Winterthur, Switzerland

[21] Appl. No.: 430,335

[22] Filed: Nov. 2, 1989

[30] Foreign Application Priority Data

Mar. 23, 1989 [DE] Fed. Rep. of Germany ... 8903667[U]

[51] Int. Cl.$^5$ .............................. G01L 7/08; G01L 9/04
[52] U.S. Cl. ..................................... 73/756; 73/726; 73/DIG. 4
[58] Field of Search ................ 73/756, 754, 753, 726, 73/727, 723, 724, 725, 728, 146.8, DIG. 4; 338/4; 361/283

[56] References Cited

U.S. PATENT DOCUMENTS

| | | | |
|---|---|---|---|
| 2,164,638 | 7/1939 | Broeze et al. | 73/727 |
| 2,629,801 | 2/1953 | Warshaw | 338/4 |
| 3,225,859 | 12/1965 | Davidson | 181/0.5 |
| 3,244,006 | 4/1966 | Delmonte | 73/726 |
| 3,247,719 | 4/1966 | Chelner | 73/726 |
| 3,335,381 | 8/1967 | DiGiovanni | 338/4 |
| 3,857,287 | 12/1974 | Sonderegger et al. | 73/727 |
| 4,399,706 | 8/1983 | List et al. | 73/726 |
| 4,519,254 | 5/1985 | Sonderegger et al. | 73/726 |
| 4,559,821 | 12/1985 | Engeler et al. | 73/727 |
| 4,735,091 | 4/1988 | Engeler et al. | 73/756 |

FOREIGN PATENT DOCUMENTS

| | | | |
|---|---|---|---|
| 0062278 | 1/1949 | Netherlands | 73/726 |
| 0193759 | 5/1967 | U.S.S.R. | 73/728 |

Primary Examiner—Donald O. Woodiel
Attorney, Agent, or Firm—Barnes & Thornburg

[57] ABSTRACT

A single transducer body having a sealing arrangement including both shoulder sealing surfaces and front end sealing surfaces to seal with mounting holes of component at offset shoulder or front end sealing surfaces.

13 Claims, 2 Drawing Sheets

HIGH-PRESSURE TRANSDUCER

BACKGROUND AND SUMMARY OF THE INVENTION

The invention relates generally to a high-pressure transducer to be mounted in a mounting hole in a component, consisting of a sensor joined to the transducer body and having a diaphragm and an arrangement for sealing the transducer against the mounting hole.

The invention relates especially, though not exclusively, to pressure transducers for detecting high pressures at elevated temperatures, as are encountered typically when the transducer is used in combustion engines, for ballistic pressure measurements or in plastics injection molding.

The main problem is the sealing of the transducer against the mounting hole, which calls for the application of considerable sealing forces. These affect the sensor element and may be detrimental to its sensitivity. Known are transducers (EP-A-90 871 and 90 872) which can be fitted in the mounting hole to seal either at a shoulder surface or front end surface. Further examples of sealing at shoulder surfaces include U.S. Pat. Nos. 3,857,287; 4,399,706; 4,519,254 and 4,735,091. A further example of a sealing at a front end surface includes U.S. Pat. No. 4,559,821.

Thus, it is an object of the present invention to create a pressure transducer which can be sealed both at a shoulder surface and a front end surface.

Another object is to provide a single pressure transducer which is capable of being sealed at shoulder surfaces and front end surfaces of mounting holes.

These objects are achieved, according to the present invention, by a transducer body having sealing arrangement including both a shoulder sealing surface and a front end sealing surface. According to a preferred development of the invention, the shoulder sealing surface may be provided at an intermediate section of the axial extent of the transducer body with an integral shell part of enlarged diameter, which can be made to seal against a shoulder offset surface of a mounting hole. The front end sealing surface is provided on an integral tubular extension at the front end of the transducer body. In order to isolate the force flow lines essentially from the sensor when using the shoulder sealing to seal the transducer, an annular gap can be provided between the sensor and the transducer body. The effects on the sensor of the force flow lines occurring in front end sealing are circumvented or alleviated, by providing an elastic front connection between the transducer body and sensor isolate.

The transducer body may be mounted to a mounting hole by a thread section, which preferably is between the intermediate section and the front end or by an externally threaded retainer which engages a retainer surface of the intermediate section.

Other objects, advantages and novel features of the present invention will become apparent from the following detailed description of the invention when considered in conjunction with the accompanying drawings.

DETAILED DESCRIPTION OF THE DRAWINGS

Figure 1:
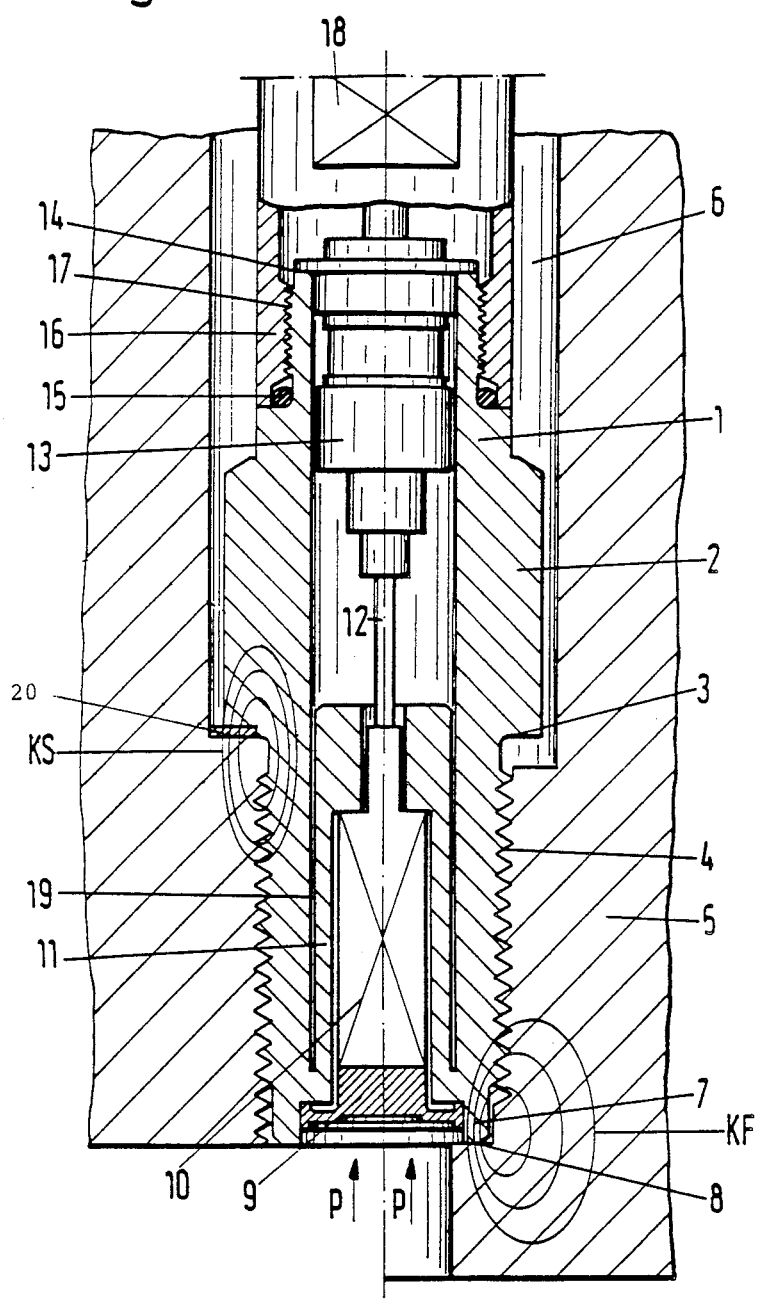
FIG. 1 is a partial cross-sectional view of a high-pressure transducer constructed according to the invention for screwing into a mounting hole with shoulder sealing on the left and front end sealing on the right.

FIG. 1 shows an embodiment of the high-pressure transducer according to the invention. The transducer body 1 has the form of a hollow screw, whose male thread 4 on the front end and fits into a female thread of the mounting hole 6 in the component 5. The sensor assembly comprises a diaphragm 9 mounted at the front end, which transmits the medium pressure p onto a sensor element 10, that in turn converts the mechanical signals into electrical signals which are transmitted by signal lead 12. The necessary mechanical preloading of the sensor element 10 is applied by a preload sleeve 11. At its rear end, the signal lead 12 is connected with a plug 13, which, as indicated at 14, may be welded to seal hermetically with the transducer body 1. The hermetic seal prevents any ingress of moisture from the outside space, which might impair the insulation and produce a corrosive action.

The transducer body is designed specifically to seal with either the shoulder or the front end. In either case, the design ensures that the sealing forces cannot act on the sensor element 10 (i.e. antistrain construction) The shoulder seal, shown on the left in FIG. 1, is provided in the form of a shell body or intermediate section 2 with enlarged diameter (it may have a hexagonal form for example) arranged close to the rear end of the thread section 4 on the transducer body 1 and between the front and rear ends of the transducer body 1. The intermediate section 2 has a sealing surface 3 on its underside. When the shell body is tightened, this sealing surface 3 seals against a shoulder or offset surface sealing surface of the mounting hole 6, which below the shoulder surface takes the form of a threaded hole of smaller diameter than above the shoulder surface. The force flow lines KS, caused by the sealing forces with shoulder sealing, run in the component 5, intermediate section 2 and upper part of the threaded section of the transducer body 1. Because the sensor assembly 9, 10, 11 is mounted elastically in the tubular extension 7 and is separated from the transducer body by an annular gap 19, the sealing forces are essentially unable to influence the sensitivity of the sensor element 10. By using a sealing ring 20, it is possible to reduce the demands of surface quality and alignment accuracy of the sealing surfaces. The shell body 2 and the transducer body 1 may be two rigidly joined components or consist of a single part.

The front seal (shown on the right of FIG. 1) of the transducer is obtained by forcing the tubular extension 7 carrying a sealing surface 8 on its front end against a corresponding lower offset surface of the mounting hole 6 by turning the shell body 2 (the upper offset surface or shoulder 3 is not used here). The sealing forces resulting from this cause force flow lines KF, which pass essentially through the tubular extension 7, the bottommost threaded part of the transducer body 1 and the component 5. The short tubular extension 7 has a very good diametral dimensional stability, so that it does not yield when loaded by the sealing forces. Moreover the connection between the transducer body 1 and the sensor assembly 9, 10, 11, which passes through the outer grooved zone of the diaphragm 9 and a circumferential flange of the preloading sleeve 11, is elastic and accommodates any slight deformation of the front extension 7 on the transducer body 1.

The heat flows pass preferentially through the outer zones of the transducer, so that the sensor assembly 9, 10, 11 is protected against heating This enables the transducer to be employed, at least briefly, under temperatures up to 400° C. In addition the error due to thermal shock is reduced considerably.

At the rear end of the transducer body 1, a connecting plug 18 may be fitted over a connecting tube 16 by a thread 17. This plug-and-socket connection is also protected against detrimental influences of the outside atmosphere by sealing ring 15.

Figure 2:
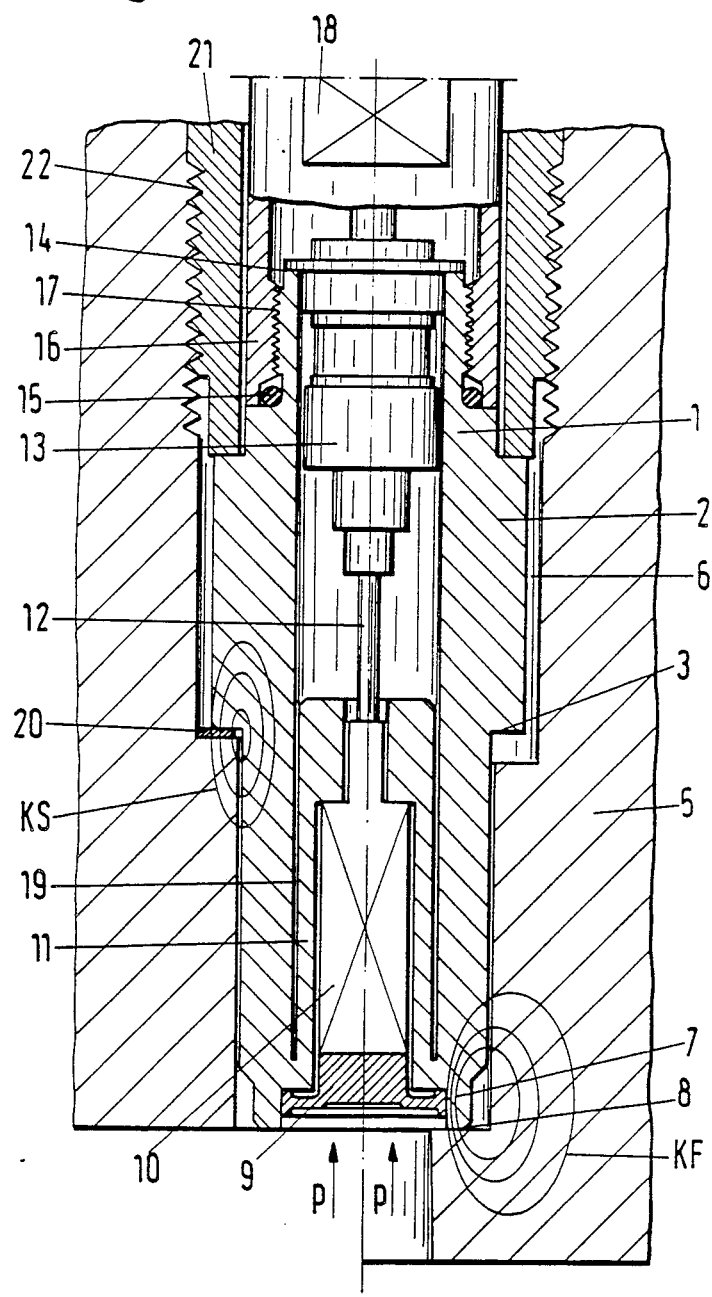
FIG. 2 is a partial cross-sectional view of a high-pressure transducer similar to FIG. 1 with a threaded retainer for fixing the transducer in the mounting hole with shoulder sealing on the left and front end sealing on the right.

FIG. 2 shows a transducer according to the invention, on which the sealing forces are applied by a retainer 21 with male thread 22 matching the female thread 23 in the rear mounting hole 6. The retainer engages a rear end of the intermediate section 2 at a retainer surface By turning the retainer 21, which may typically have a hexagonal section at its rear end (not shown), the sealing forces may be applied for either the shoulder seal shown on the left in the FIG. 2 or for the front end seal shown on the right of FIG. 2. As in the embodiment shown in FIG. 1, the shoulder sealing part is provided with a sealing ring 20.

Thus it can be seen by comparing FIGS. 1 and 2 that a single transducer body has been designed which not only provides the capability of being sealed in a mounting hole at a shoulder surface or a front end surface, but also the ability to be mounted in a mounting hole threaded adjacent its front end or adjacent its back end. This reduces the number of kinds of transducer bodies which must be available. Although not illustrated, the front section of the transducer body in FIG. 2 may include the thread 3, even through there are no corresponding mating threads in that specific mounting hole.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. High pressure transducer to be mounted in either a first or second distinct type of mounting hole in a component comprising:
    a transducer body;
    a sensor means mounted to said transducer body;
    a diaphragm means mounted to said sensor means and transducer body;
    first means integral to said transducer body for forming a shoulder seal only with a first type of mounting hole; and
    second means integral to said transducer body for forming a seal at a front end of said transducer body only with a second type of mounting hole.

2. High pressure transducer according to claim 1, wherein said first means includes an intermediate section between the axial ends of said transducer body of an enlarged radial diameter to form a shoulder sealing surface which can be sealed against a shoulder offset surface of a first type of mounting hole.

3. High pressure transducer according to claim 2, wherein said sensor means is mounted to said transducer body by third means providing an annular gap therebetween for isolating said sensor means from sealing forces.

4. High pressure transducer according to claim 2, wherein said second means includes a tubular extension with a sealing surface which can be sealed against an offset surface of a second type mounting hole 5. High pressure transducer according to claim 4, wherein said sensor means is mounted to said transducer body by elastic means for isolating said sensor means from sealing forces.

6. High pressure transducer according to claim 2, wherein said intermediate section forms a retainer surface which can receive an externally threaded retainer which mounts said transducer body to a mounting hole.

7. High pressure transducer according to claim 2, wherein said transducer body includes a thread section between said intermediate section and said front end which can mount said transducer body to a mounting hole.

8. High pressure transducer according to claim 1, wherein said sensor means is mounted to said transducer body by third means providing an annular gap therebetween for isolating said sensor means from sealing forces.

9. High pressure transducer according to claim 1, wherein said second means includes a tubular extension with a sealing surface which can be sealed against an offset surface of a second type mounting hole.

10. High Pressure transducer according to claim 1, wherein said sensor means is mounted to said transducer body by elastic means for isolating said sensor means from sealing forces.

11. High pressure transducer according to claim 1, wherein said diaphragm is adjacent said front end of said transducer housing.

12. High pressure transducer according to claim 1, wherein said transducer body includes a threaded section which mounts said transducer to a mounting hole.

13. High pressure transducer according to claim 12, wherein said threaded section is between said first and second means.

* * * * *